United States Patent [19]

Iwahashi et al.

[11] Patent Number: 5,255,144
[45] Date of Patent: Oct. 19, 1993

[54] BRAKE DEVICE FOR TAPE REEL IN MAGNETIC TAPE CASSETTE

[75] Inventors: Yuji Iwahashi; Kiyoshi Urayama; Toshihiro Watanabe; Shinya Sato; Masanori Tanaka, all of Tokyo, Japan

[73] Assignee: Sony Corporation, Japan

[21] Appl. No.: 853,869

[22] Filed: Mar. 20, 1992

Related U.S. Application Data

[63] Continuation of Ser. No. 676,451, Mar. 26, 1991, abandoned, which is a continuation of Ser. No. 71,333, Jul. 9, 1987, abandoned.

[30] Foreign Application Priority Data

Jul. 18, 1986 [JP] Japan .................. 61-110796[U]

[51] Int. Cl.$^5$ ........................................... G11B 23/02
[52] U.S. Cl. ........................................ 360/132; 242/198
[58] Field of Search ........................ 360/132; 242/198

[56] References Cited

U.S. PATENT DOCUMENTS

| 4,022,401 | 5/1977 | Kishi ................... 242/198 |
| 4,579,295 | 4/1986 | Harada ................ 360/132 |
| 4,585,187 | 4/1986 | Okamura et al. ... 242/198 |
| 4,604,671 | 8/1986 | Oishi .................. 360/132 |
| 4,631,619 | 12/1986 | Hashizume et al. ... 242/198 X |
| 4,679,110 | 7/1987 | Schoettle et al. ... 360/132 |

FOREIGN PATENT DOCUMENTS

| 0111876 | 6/1984 | European Pat. Off. . |
| 0146311 | 6/1985 | European Pat. Off. . |
| 0153137 | 8/1985 | European Pat. Off. ... 360/132 |
| 0163293 | 12/1985 | European Pat. Off. . |
| 0179169 | 4/1986 | European Pat. Off. . |
| 0210582 | 9/1986 | Japan ................. 360/132 |
| 2044733 | 10/1980 | United Kingdom . |
| 2114952 | 9/1983 | United Kingdom . |
| 2131769 | 6/1984 | United Kingdom . |

Primary Examiner—Andrew L. Sniezek
Attorney, Agent, or Firm—Ronald P. Kananen

[57] ABSTRACT

A reel brake device for a tape reel of a magnetic tape cassette has a pair of braking strips for a supply reel and a take-up reel. The braking strips are formed with at least one hinged section to allow resilient deformation in order to absorb kinematic energy exerted on the braking strips from the tape reel as the reel is subjected to rotational torque or lateral force. By providing the capability of resilient deformation for the braking strips, braking engagement can be maintained even when vibration exerting rotational force is applied to the tape reels.

18 Claims, 4 Drawing Sheets

BRAKE DEVICE FOR TAPE REEL IN MAGNETIC TAPE CASSETTE

This application is a continuation of application Ser. No. 07/676,451 filed Mar. 26, 1991, abandoned which is a continuation of application Ser. No. 07/071,333, filed Jul. 9, 1987 now abandoned.

BACKGROUND OF THE INVENTION

1. Field of the Invention

The present invention relates generally to a reel brake device for preventing a tape reel in a magnetic tape cassette from turning or rotating in a direction creating slack in a tape run. More specifically, the invention relates to a reel brake device which prevents turning of the tape reel while the magnetic tape cassette is not in use, even when a vibration is exerted on the magnetic tape cassette.

2. Description of the Background Art

In a magnetic tape cassette, such as a video tape cassette (VTR cassette), a pulse-code-modulated (PCM) audio tape cassette and so forth, used with a recording and/or reproducing apparatus, a magnetic tape in a cassette housing runs from a supply reel housed within the internal space of the cassette housing, to a rotary magnetic head assembly in the body of the recording and/or reproducing apparatus, and back to a take-up reel in the cassette housing. The length of tape that contacts the head assembly in the recording and/or reproducing apparatus is outside the cassette housing and exposed when the cassette is not in use.

Conventionally, the magnetic tape cassette employs resilient braking strips to brake the magnetic tape as it travels to and from the tape reels and to avoid undesirable slack in the exposed length of the magnetic tape. However, the conventional reel brake device tends to release braking engagement to allow rotation of the tape reel to create tape slack, when the rotational force is exerted on the tape reel due to vibration. Namely, since the conventional reel brake device has a pair of braking strips for the respective supply reel and the take-up reel are formed integrally with a brake body which carries the braking strips toward and away from the locking teeth of reel flanges of the tape reels. Such construction of the conventional reel brake device tends to incline toward one tape reel when the rotational force in one direction is exerted. This causes the other braking strip to release from the locking or braking engagement with the locking teeth of the corresponding tape reel. By releasing the braking engagement, the other tape reel is allowed to rotate to create tape slack.

SUMMARY OF THE INVENTION

Therefore, it is an object of the present invention to provide a reel brake device for a tape reel of a magnetic tape cassette which prevents the tape reel from rotating so as not to create tape slack.

In order to accomplish the aforementioned and other objects, a reel brake device is provided for a tape reel of a magnetic tape cassette, which reel brake device has a pair of braking strips for a supply reel and a take-up reel. The braking strips are formed at least one hinged section to allow resilient deformation. By providing the capability of resilient deformation for the braking strips, braking engagement can be maintained even when a vibration-exerting rotational force is applied to the tape reels.

According to one aspect of the invention, a reel brake device for a magnetic tape cassette including a tape reel with a reel flange, which tape reel being disposed within a cassette housing, comprises a cut-out formed on the outer periphery of the reel flange, a brake assembly having a body and a blade-like braking tang, the braking assembly being movable between a locking position, at which the braking tang engages with the cut-out for restricting rotation of the tape reel, and an unlocking position, at which the braking pawl is positioned away from the cut-out for allowing rotation of the tape reel, and means, associated with the brake assembly and cooperated with the braking pawl, for absorbing a force exerted to the brake assembly through the braking pawl engaging with the cut-out to force the latter to the unlocking position, so that the brake assembly can be maintained at the locking position.

In the preferred construction, the force absorbing means provides flexibility for the braking pawl for allowing resilient deformation in response to the force for absorbing the force. The force absorbing means allows resilient deformation of the braking pawl at a predetermined portion. Namely, by the deformation of the braking pawl, kinematic energy to be exerted onto the brake assembly and whereby forcing the brake assembly to cause shifting from the locking position to the unlocking position can be successfully absorbed. On the other hand, by providing flexibility for the braking pawl, it may be preferable to provide means for restricting the magnitude of resilient deformation of the braking pawl in order to avoid accidental release of the locking engagement between the braking pawl and the cut-out. In order to make effective a restriction of the deformation of the braking pawl, the deformation restricting means may comprise a stopper member oriented adjacent the predetermined portion. It would be preferable that the stopper member comprises a first component restricting lateral deformation of the braking pawl in a first direction and a second component restricting lateral deformation of the braking pawl in a second direction opposite to the first direction.

In addition, the reel brake device set forth above may further comprise means for defining a longitudinally extending guide path for the brake assembly, in which the brake assembly moves between the locking and unlocking positions, the guide path defining means including guide walls extending along the guide path. In this case, the guide walls include a portion working as a retainer for retaining the brake assembly within the guide path. Furthermore, preferably and conveniently, the retainer portion of the guide walls serves as the first component of the stopper member.

In the practical embodiment, the force absorbing means may comprise a thin portion formed in the braking pawl. The thin portion is formed at a longitudinal intermediate section of the braking pawl and/or at a joining end of the braking pawl, at which the braking pawl is joined with the body.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
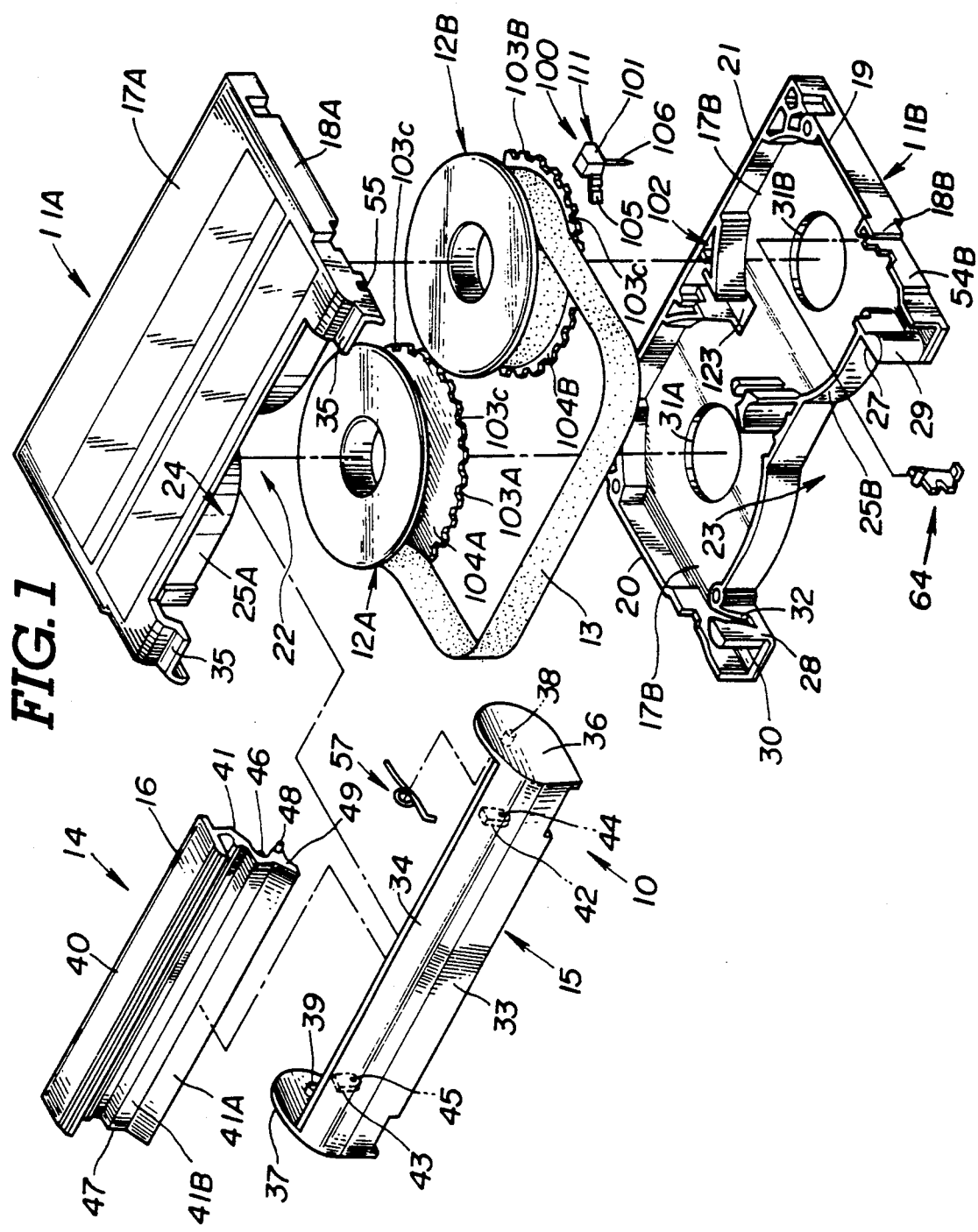
FIG. 1 is an exploded perspective view showing the various major components of a magnetic tape cassette, to which the preferred embodiment of a reel brake arangement is applied.
Figure 2:
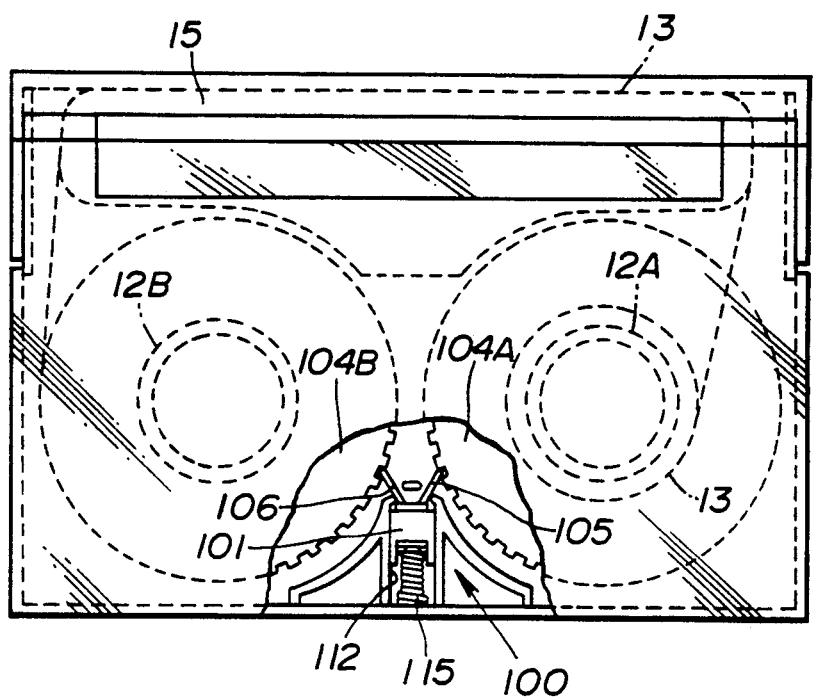
FIG. 2 is a partially cut-out plan view of the magnetic tape cassette with the preferred embodiment of a reel brake arrangement, of FIG. 1.

Referring now to the drawings, particularly to FIGS. 1 and 2, the preferred embodiment of a reel brake arrangement according to the present invention is applied for a specific type of a magnetic tape cassette which is particularly adapted for an 8-mm VTR. Though this specific construction of the magnetic tape cassette has been disclosed in combination with the preferred embodiment of the reel brake arrangement according to the invention, the invention should not be limited to the shown embodiment for the specific construction of the magnetic tape cassette, but can be in any suitable form to be adaped for various types of magnetic tape cassettes. Therefore, FIGS. 1 and 2 show a tape cassette 10 of this type in which the invention is used and is provided primarily for background in understanding the use of the upper reel flange according to the invention. Reference may also be made to copending application Ser. No. 651,452, now U.S. Pat. No. 4,633,355, filed Sep. 17, 1984, and assigned to the assignee of the instant invention, for further details concerning FIG. 1. As is apparent, the tape cassette 10 is of a type intended for use in an 8-mm video tape recorder (VTR).

The cassette 10 comprises a substantially rectangular cassette housing 11 composed of upper and lower housing portions 11A and 11B, a pair of reels generally indicated by reference numerals 12A and 12B rotatably contained in the housing 11 in a side-by-side relation and having magnetic tape 13 wound on the reels. The cassette 10 includes a back lid assembly 14 and a front lid assembly 15. The lid assembly 14 is pivotally mounted on the housing 11 for movement between open and closed positions. In the open position of the lid assembly 14, a run of the tape between reels 12A and 12B is exposed for withdrawal from the housing 11 while, in the closed position, the lid assembly 14 covers or encloses the tape run both at the front and back of the tape run.

The upper and lower housing portions 11A and 11B have substantially rectangular top and bottom walls 17A and 17B, respectively, and flanges 18A and 18B extend along the margins of the top and bottom walls 17A and 17B, respectively, and engage each other at a plane of separation which is substantially parallel with the walls 17A and 17B when the housing portions 11A and 11B are brought together vertically, that is, at a direction normal to a plane of separation for defining a peripheral structure of the housing. The peripheral structure of the housing includes end walls 19 and 20 at the opposite relatively short end of the housing 11 and a back or side wall 21 along one of the relatively long sides of the rectangular housing. At the front or other long side of the housing, an opening between the back lid assembly 14 and the front lid assembly 15 is defined which extends substantially from one to the other of the end walls 19 and 20. The bottom wall 17B has an approximately trapezoidal cutout 23 communicating with the tape run opening. Thus, the ends of the cutout 23 are spaced inwardly from the end walls 19 and 20.

A substantially rectangular cutout 24 which is approximately as wide as the cutout 23 is formed in the forward portion of the top wall 17A and has a depth smaller than the depth of the cutout 23 as measured at the middle of the housing 11. A flange 25A with curving portions depends from the top wall 17A behind the cutout 24 and mates with a flange 25B having similarly curving portions directed upwardly from the bottom wall 17B along the back edge of the cutout 23. When the housing portions 11A and 11B are brought vertically together, the flanges 25A and 25B on the upper and lower housings 11A and 11B mate to define a partition by which a space containing the reels 12A and 12B within the housing is isolated from the opening 22 and the cutout 23.

At the opposite ends of the cutout 23, the housing portion 11B is formed or molded with upstanding walls 27 and 28 directed forwardly from the opposite ends of the flange 25B. The walls 27 and 28 are higher than the flange 25B so as to extend freely from the bottom wall 17B to the top wall 17A in the assembled cassette 10. The outwardly directed surfaces of the walls 27 and 28 which are spaced from the end walls 19 and 20 are formed with rounded or semi-cylindrical surface portions 29 and 30 acting as tape guides at the opposite ends of the tape opening. The bottom wall 17B has laterally spaced apart circular apertures 31A and 31B in which hubs of reels 12A and 12B, respectively are loosely received for rotatably locating the reels in the cassette 10 and through which drive shafts or spindles (not shown) of a VTR can conventionally engage the hubs of the reels 12A and 12B when the cassette 10 is operatively positioned in the VTR.

The tape 13 which extends between the reels 12A and 12B is directed forwardly from the reels at about guides 29 and 30 so as to establish a tape run extending across the opening. The walls 27 and 28 include curving guide grooves 32 extending approximately vertically in their inwardly directed surfaces for controlling pivoting movement of an inner lid member relative to the outer lid member 15 during movement of the latter between opened and closed positions of the lid assembly 14.

The outer lid member 15 includes a front wall portion 33 which is laterally elongated to have a length substantially equal to the distance between the end walls 19 and 20 of the housing 11, a shallow top wall portion 34 extending from the upper edge of the front wall portion and having a width smaller than the depth of the cutout 24 in the top wall 17A so as to be engageable over depressed, shelf-like extensions 35 of the top wall 17A at the opposite ends of the cutout 24.

Ears 36 and 37 directed rearwardly from the opposite ends of the front and top wall portions 33 and 34 have inwardly directed pivot turns or trunians 38, respectively, for pivotally mounting the outer lid member on the end walls 19 and 20. When thus pivotally connected with the housing 11, the outer lid member 15, in its closed position, has its wall portion 33 covering the front surface of the tape run, while the top portion 34 of the lid member 15 extends over the tape run. The inner lid member 16 has a length substantially equal to that of the cutout 24 and includes an elongated head portion 40 dimensioned to span the gap between the longitudinal edge of the cutout 24 and the top wall portion 34 of the outer lid member 15 in the closed position of the latter. The inner lid member 16 includes an angled skirt portion 41 extending generally downwardly and forwardly from the head portion 40 along the length of the latter. The skirt portion 41 is dimensioned so that when the lid assembly 14 is in its closed position, the skirt portion 41 extends downwardly behind the tape run with the lower edge part 41A of the skirt portion 41 substantially abutting the lower edge portion of the front wall portion 33 under the tape run. Thus, the tape run between the reels 12A and 12B is substantially enclosed and protected within a space defined between the lid members 15 and 16 in the closed position of the assembly 14 so that there is no possibility of dust accumulating on or other injurious contact with the back surface of the tape run through the cutout 23.

Mounting lugs 42 and 43 are preferably mounted integrally with the top wall portion 34 of the outer lid member 15 at laterally spaced locations corresponding to the ends of the inner lid member 16 and are formed with openings 44 and 45 for pivotally receiving aligned pins 46 and 47 extending from opposite ends of an intermediate part 41B of the skirt portion 41. The lug members 42 and 43 are desirably laterally resilient while the end surfaces of the pivot pins 46 and 47 are oblique or slanted to permit such pivot pins to snap into the respective holes 44 and 45 of the mounting lugs 42 and 43. Upon engagement of the pins 46 and 47 in the holes of lugs 42 and 43, the inner lid member 16 is mounted on the outer lid member 15 for pivotable movement with respect to the latter.

Movements of the inner lid member 16 relative to the outer lid member 15 are affected in response to pivotal movement of the outer lid member 15 relative to the housing 11 by means of follower pins 48 and 49 at the opposite ends of the free edge part 41A of the skirt portion 41. The follower pins 48 are slidably engageable in the cam or guide grooves 32 in the end walls 27 and 28. The illustrated shape of each of the cam or guide grooves 32 is selected to insure that the lower edge part 41A of the skirt portion 41 comes close to the lower edge of the front wall portion 33 only when the lid assembly 14 is approximately at its wholly closed position for avoiding any contact of the lid assembly with the tape run during movement of the opened and closed positions of the lid assembly.

In order to urge the lid assembly 14 to its closed position, the tape cassette 10 further includes a coil spring 57 associated with the pivot pin 38.

The tape cassette 10 further includes a latch element 64 mounted adjacent the end wall 19 of the housing 11. The latch element 64 had an engaged condition for locking the lid assembly 14 in its closed position and a releasing or disengage position for permitting movement of the lid assembly to its opened position. The coil spring 57 is thus provided for urging the lid assembly 14 to its closed position but also acts on the latch element 64 when the housing portions 11A and 11B are assembled together for urging the latch element 64 to the engaged condition thereof.

The cassette 10 further includes a reel brake arrangement 100 which acts as a reel lock and includes a brake body 101 and a brake guide structure 102 in the housing 11 at a location between the reels 12A and 12B adjacent the side of the housing remote from the opening 22. The brake guide structure 102 operates to guide the brake body 101 in the fore and aft direction, that is, in a direction parallel to the plane of separation of the housing portions 11A and 11B. A pair of braking pawls 105 and 106 which are resilient and in a form of blade-like extensions, project from the brake body 101 to the reels 12A and 12B, respectively,, and are engaged with two peripheries 103A and 103B of the lower flanges 104A and 104B with a plurality of braking pawl rests 103C formed along the periphery with a given regular intervals. Each braking pawl rest 103C is in a form of an essentially rectangular or square cut-out for receiving the free end of the associated braking pawl 105 or 106 to establish a reel locking condition.

Figure 3:
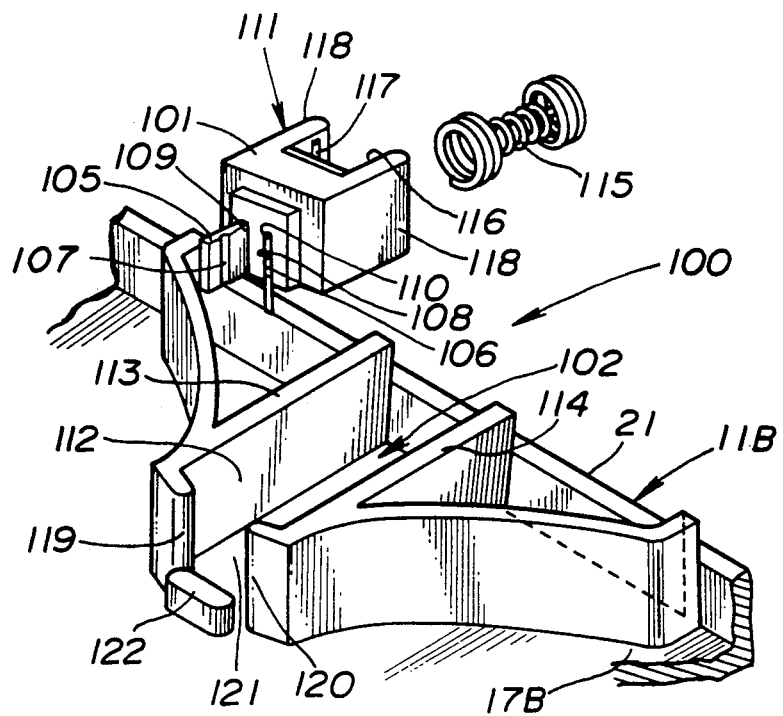
FIG. 3 is an enlarged and exploded perspective view of the preferred embodiment of the reel brake arrangement according to the invention.
Figure 4:
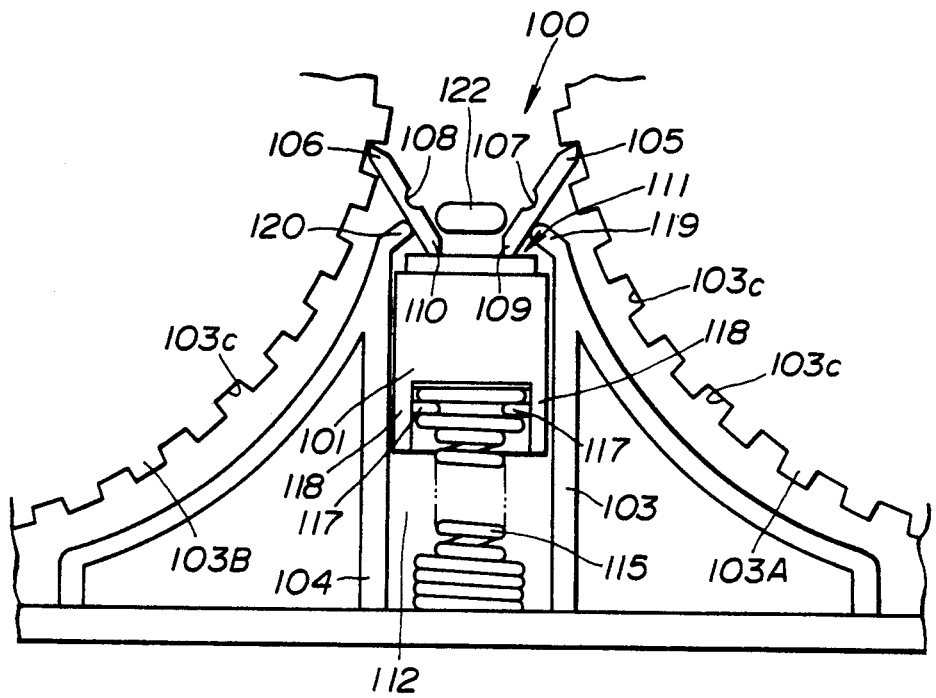
FIG. 4 is an enlarged plan view of the preferred embodiment of the reel brake arrangement of FIG. 1, which is illustrated in an operative position for locking tape reels.

The further detailed construction of the preferred embodiment of the reel brake arrangement 100 according to the present invention will be illustrated herebelow with reference to FIGS. 2 to 4. In the shown embodiment, the brake body 101 has the pair of resiliently deformable braking pawls 105 and 106 having the aforementioned free ends oriented at the positions for engaging with one of the braking pawl rests 103C on the associated periphery 103A and 103B of the lower reel flanges 104A and 104B. For this, each of the braking pawls 105 and 106 is projected frontwardly from the front end periphery of the brake body 101. The braking pawls 105 and 106 are provided with resiliency allowing deformation and resiliently retaining themselves at their initial positions. At the initial positions, the free ends of the pawls 105 and 106 are placed away from each other at the distance greater than that at the joining sections 109 and 110, at which the pawls are joined with the brake body 101. Therefore, the respective braking pawls extend obliquely toward an outward portion with respect to the longitudinal axis of the brake body 101 to form an essentially V-shaped configuration. Each braking pawl 105 and 106 has a surface opposing to the corresponding surface on the other pawl, which surface will be hereafter referred to as an "inner surface". The surface of the braking pawls 105 and 106 at the opposite side to the inner surface will be referred to as an "outer surface". Essentially vertical grooves 107 and 108 are formed on the inner surfaces of the braking pawls 105 and 106. Furthermore, the braking pawls 105 and 106 are reduced in thickness at the sections 109 and 110, at which the pawls are joined with the brake body 101. The grooves 107 and 108 and the joining sections 109 and 110 with the reduced thickness are cooperative to provide flexibility for the braking pawls 105 and 106 to exhibit high performance in maintaining braking engagement with the associated braking pawl rests 103C.

The brake body 101 and the braking pawls 105 and 106 as set forth above constitute a brake assembly 111. The brake assembly 111 is disposed within a longitudinally extending path 112 defined by means of guide walls 113 and 114 extending frontwardly from the back side wall 21. The resilient member 115 which is in a form of a coil spring in the shown embodiment, is also disposed within the longitudinally extending path 112. The rear end of the coil spring form resilient member 115 is seated on the inner periphery of the back side wall 21 and the front end thereof is received within a cut-out 116 formed on the back side of the brake body. As seen, retainer projections 117 are projected from side walls 118 defining the back side cut-out 116 to engage with the front end of the coil spring form resilient member 115 to maintain the resilient member and the brake body in the assembled condition.

The front ends 119 and 120 of the guide walls 113 and 114 are bent toward each other to provide a limited opening end path 121, through which the braking pawls 105 and 106 extend frontwardly. These bent front ends 119 and 120 serve in cooperation to each other, as a stopper for retaining the brake assembly 111 within the longitudinally extending path. For this purpose, the distance between the closest ends of the bent front ends 119 and 120 is set smaller than the lateral width of the brake body. On the other hand, the inwardly bent front ends 119 and 120 also serve for limiting outward deformation of the braking pawls 105 and 106, particularly when rotational torque and/or lateral force are exerted on the tape reel in the reel locking condition.

A stopper projection 122 is projected from the bottom wall 17B of the lower housing portion 11B. The stopper projection 122 is laterally elongated in form and located at the intermediate position between the mutually opposing ends of the bent front ends 119 and 120. Both lateral ends of the stopper projections are rounded and mate with the inner surfaces of the braking pawls 105 and 106. Therefore, the stopper projection 122 limits inward deformation of the braking pawls.

As seen from FIG. 1, a slit or slot 123 is formed through the bottom wall 17B. Through the slot 123, a member installed on a recording and/or reproducing apparatus for driving the brake assembly 111 backwardly against the spring force for releasing the locking engagement between the braking pawls 105 and 106 and the braking pawl rests 103C, is inserted. The reel brake releasing member and operation thereof can be constructed in a per se well known manner.

While the shown magnetic tape cassette is not in use, the braking assembly 112 is shifted frontwardly by means of the resilient member 115 to extend the braking pawls 105 and 106 frontwardly from the front opening end path 121 to establish locking engagement with the braking pawl rests 103C on the peripheries 103A and 103B of the lower reel flanges 104A and 104B, as shown in FIG. 4. At this condition, if rotational torque occurring on the tape reel 12A is exerted as the rotational torque through the lower flange 104A, as indicated by arrow R in FIG. 5, the braking pawl 105 deforms outwardly in maintaining a locking engagement with the braking pawl rest 103C. The outward deformation of the braking pawl 105 is restricted, by means of the mating bent front end 119 of the guide wall 113. Therefore, the tape reel 12A is prevented from further rotation. On the other hand, when lateral displacement occurs on the tape reel 12A toward the other tape reel 12B, as illustrated by an arrow L in FIG. 6, the braking pawl 105 is deformed inwardly. However, the inward deformation of the braking pawl 105 is restricted by the stopper projection 122. Therefore, the braking pawl 105 is retained in a locking position to maintain a locking engagement with the braking pawl rest 103C.

Figure 5:
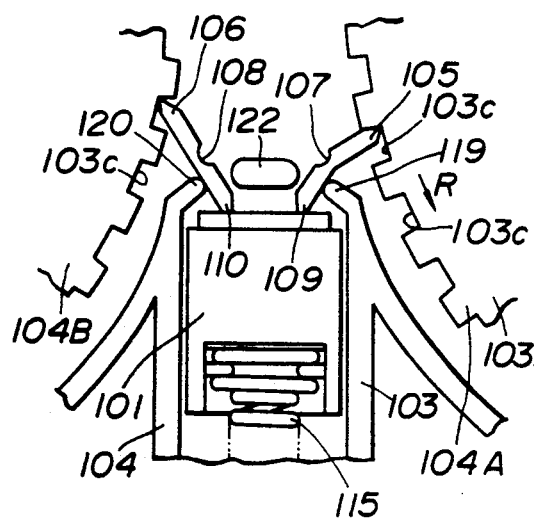
FIGS. 5 and 6 are plan views similar to FIG. 4, but showing positions where rotational and lateral forces are exerted on the tape reels.
Figure 6:
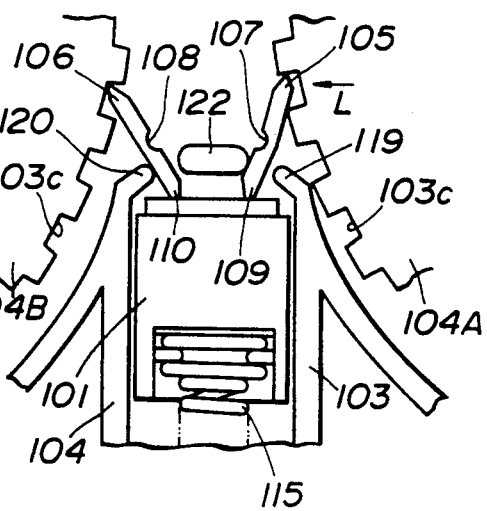

In either case of FIGS. 5 and 6, since the braking pawls 105 and 106 are provided with sufficient flexibility for causing inward and outward deformation for absorbing the backward force which will otherwise serve for causing backward shifting of the brake assembly against the spring force of the resilient member 115 to release locking engagement.

Therefore, as will be appreciated herefrom, the preferred embodiment of the reel lock arrangement according to the invention is successful in maintaining a locking engagement between the braking pawls and the braking pawl rests of the lower reel flanges.

Figure 7:
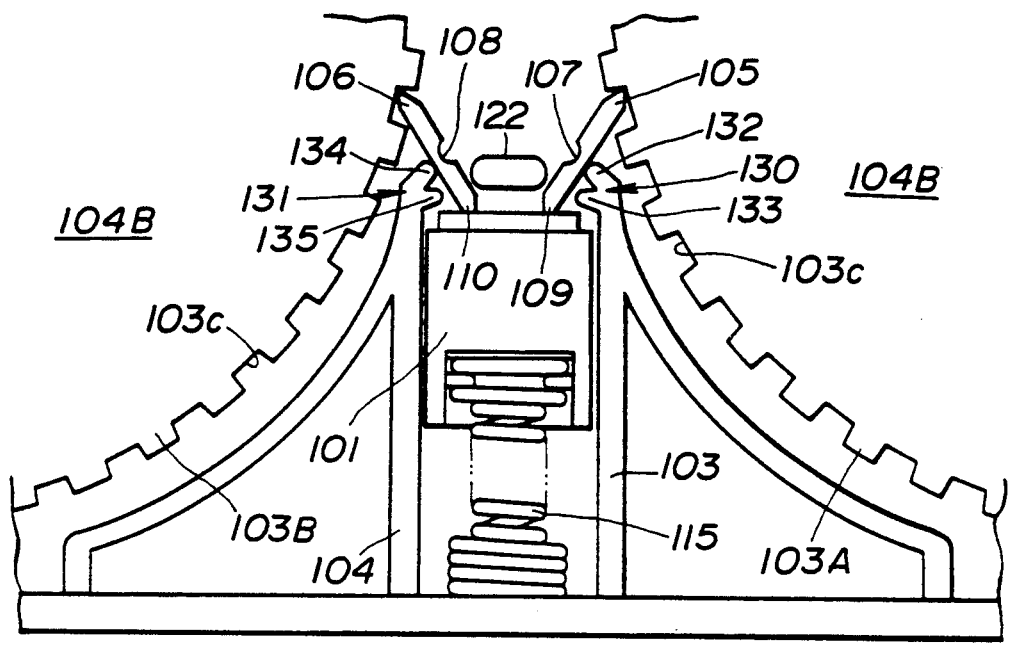
FIG. 7 is a plan view of a modified embodiment of the reel brake arrangement acccording to the present invention.
Figure 8:
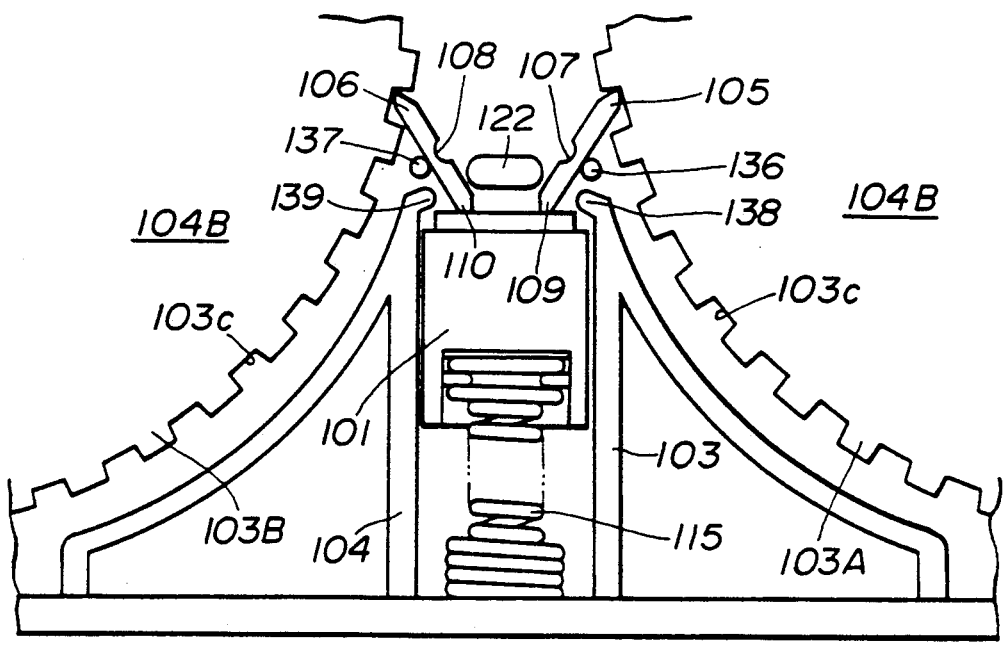
FIG. 8 is a plan view of another modified embodiment of the reel brake arrangement according to the present invention.

FIGS. 7 and 8 show modifications of the former embodiment of the reel brake arrangement according to the invention. In the modification of FIG. 7, the bent front ends 130 and 131 of the guide walls 113 and 114 are in bifurcated form to have respectively two contact points 132, 133 and 134, 135. With this construction, restriction of outward deformation of the braking pawls 105 and 106 is further assured. On the other hand, in the modification of FIG. 8, stopper projections 136 and 137 are formed separately from the guide walls 113 and 114 for restricting the outward deformation of the braking pawls 105 and 106. In this case, the bent front ends 138 and 139 of the guide walls 113 and 114 mainly work as a retainer for retaining the brake assembly 111 within the longitudinally extending path 112.

Even by these modified embodiments, substantially the same effect in maintaining locking engagement between the braking pawls and the braking pawl rests of the lower reel flanges can be assured.

Therefore, the invention set forth above fulfills all of the objects and advantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A reel brake device for a magnetic tape cassette including a tape reel with a reel flange, the tape reel being disposed within a cassette housing, comprising:

at least a rectangular pawl-engaging cut-out formed on the outer periphery of said reel flange;

a brake assembly having a body and a blade-like braking pawl;

means for guiding said brake assembly for movement between a locking position, at which said brake assembly is adjacent to said tape reel and said braking pawl engages with said cut-out for restricting rotation of said tape reel, and an unlocking position, at which said entire brake assembly is farther from said tape reel than in said locking position and said braking pawl is positioned away from said cut-out for allowing rotation of said tape reel;

said braking pawl comprising a generally flat rectangular-shaped member having a first end fixed to said body and a second end engaging said cut-out when in said locking position, said member having a narrow groove extending across the width thereof intermediate said first and second ends forming a first reduced thickness section, and a second reduced thickness section formed in said member adjacent said first end, said first and second reduced thickness sections allowing resilient deformation of said braking pawl at pre-selected locations for absorbing forces exerted on said brake assembly through said braking pawl engaging with said cut-out that would tend to force the latter from said locking to said unlocking position, so that said brake assembly can be maintained at said locking position.

2. A reel brake device as set forth in claim 1, which further comprises means for restricting the magnitude of resilient deformation of said braking pawl.

3. A reel brake device as set forth in claim 2, wherein said deformation restricting means comprises a stopper means for restricting deformation of said pawl in at least a predetermined direction.

4. A reel brake device as set forth in claim 3, wherein said stopper means comprises a first component restricting lateral deformation of said braking pawl in a first direction and a second component restricting lateral deformation of said braking pawl in a second direction opposite to said first direction.

5. A reel brake device as set forth in claim 4, wherein said means for guiding comprises means for defining a longitudinally extending guide path for said brake assembly, in which said brake assembly moves between said locking and unlocking positions, said guide path defining means including guide walls extending along said guide path.

6. A reel brake device as set forth in claim 5, wherein said guide walls include a portion working as a retainer for retaining said brake assembly within said guide path.

7. A reel brake device as set forth in claim 6, wherein said retainer portion of said guide walls serves as said first component of said stopper member.

8. A reel brake device as set forth in claim 1, further including a second tape reel in said housing and a second braking pawl, said second braking pawl extending from said brake body towards said second tape reel and having a groove therein, said braking pawls being joined to said brake body at a distance closer than the ends of said pawls which engage said tape reels.

9. A reel brake device as set forth in claim 1, wherein said means for guiding said brake assembly comprises means for guiding said brake assembly for rectilinear movement between the locking position and the unlocking position.

10. A reel brake device for a magnetic tape cassette which includes a tape reel with a reel flange, said tape reel being disposed within a cassette housing, comprising:
a brake body;
at least one resilient braking pawl in the form of a blade-like extension projecting from said brake body towards a periphery of said tape reel said periphery including a plurality of rectangular braking pawl rests at spaced locations therealong;
means for guiding said brake body for movement between a locking condition, at which said brake body is adjacent to said tape reel and said braking pawl engages said periphery, and an unlocking condition, at which said entire brake body is farther from said tape reel than in said locking condition and said braking pawl is positioned away from said periphery;
said braking pawl comprising a generally flat rectangular-shaped member having a first end fixed to said body and a second end engaging a braking pawl rest of the tape reel when in said locking condition, said member having a narrow groove extending across the width thereof intermediate said first and second ends forming a first reduced thickness section, and a second reduced thickness section formed in said member adjacent said first end, said first and second reduced thickness sections allowing resilient deformation of said pawl at pre-selected locations so that rotation of said tape reel is inhibited in said locking condition even when rotational torques and/or lateral forces are exerted on the tape reel; and
a second tape reel in said housing and a second braking pawl, said second braking pawl extending from said brake body towards said second tape reel and having a groove therein, said braking pawls being joined to said brake body at a distance closer than the ends of said pawls which engage said tape reels, said pawls being positioned between said tape reels, said grooves of the first and second pawls located on inner surfaces of said pawls to provide resilient flexibility for the braking pawls in maintaining braking engagement with the periphery of the tape reels, and stopper means oriented adjacent said pawls for restricting the magnitude of deformation of said braking pawls in a plurality of directions.

11. A reel brake device according to claim 10, wherein said means for guiding said brake body comprises means for guiding said brake body for rectilinear movement between the locking condition and the unlocking condition.

12. A tape cassette including a pair of tape reels disposed within a cassette housing, with each of said tape reels having a reel flange, comprising:
a brake guide structure located in said cassette housing generally between said pair of tape reels;
a brake body, the entire brake body being slidable within said brake guide in a direction generally toward said tape reels to establish a locking condition for said tape reels and generally away from said tape reels to establish an unlocking condition for said tape reels;
a pair of resilient braking pawls in the form of blade-like extensions extending obliquely outward from said brake body to form an essentially V-shaped configuration projecting generally toward said tape reels, each of said braking pawls has a free end for engaging a plurality of rectangular braking pawl rests located at spaced locations along a periphery of each of said tape reels during said locking condition and for disengaging said braking pawl rests during said unlocking condition; and
each of said braking pawls comprising a generally flat rectangular-shaped member having a first end fixed to said brake body and a second end engaging a braking pawl rest of the tape reel when in said locking condition, said member having a narrow groove extending across the width thereof intermediate said first and second ends forming first reduced thickness section, a second reduced thickness section formed in said member adjacent said first end, said first and second reduced thickness sections allowing resilient deformation of said braking pawls at pre-selected locations so that rotation of said tape reels is inhibited in said locking condition even when rotational torques and/or lateral forces are exerted on the tape reels.

13. A tape cassette as set forth in claim 12, wherein said brake guide includes a pair of bent front ends for limiting movement of said brake body toward said tape reels and for limiting outward deformation of said braking pawls when rotational torque and lateral force are exerted on the tape reels in the locking condition.

14. A tape cassette as set forth in claim 13, further comprising a stopper projecting from said cassette housing and located at an intermediate position between said bent front ends of said brake guide to limit deformation of said braking pawls toward one another.

15. A tape cassette as set forth in claim 14, wherein said stopper includes rounded lateral end portions which mate with said inner surfaces of said braking pawls to limit said deformation.

16. A tape cassette as set forth in claim 13, wherein each of said bent front ends of said brake guide is bifurcated to define two contact points to restrict outward deformation of said braking pawls.

17. A tape cassette according to claim 12, wherein said brake body is slidable rectilinearly within said brake guide between said locking condition and said unlocking condition.

18. A reel brake device for a magnetic tape cassette including a pair of tape reels rotatably mounted in the cassette in a side-by-side relation, the tape reels including reel flanges having outer peripheries, comprising:

pawl-engaging cut-outs formed on the outer peripheries of said reel flanges;

a brake body;

a pair of resilient braking pawls in the form of blade-like extensions projecting from the brake body;

means for guiding said brake body for rectilinear sliding movement between a locking position, in which said brake body is adjacent to said reels and said braking pawls engage the peripheries of the tape reels, and an unlocking position, in which the entire brake body is farther from said tape reels than in said locking condition and said braking pawls are positioned away from the peripheries of the tape reels, said guiding means comprising parallel guide walls in the cassette, the brake body being positioned between the guide walls, said braking pawls extending at an oblique angle relative to the direction of the rectilinear sliding movement of the brake body and toward the peripheries of the tape reels, each said braking pawl having an inner surface facing toward the other braking pawl and an outer surface facing away from the other braking pawl;

means for absorbing a force exerted on the reel brake device as a result of engagement of said braking pawls with said pawl-engaging cut-outs on the outer peripheries of said reel flanges, said force absorbing means comprising narrow vertical grooves defined on the inner surfaces of the braking pawls and extending transverse to the directions in which said braking pawls project from said brake body, at least one a first of said narrow grooves on each braking pawl located intermediate a first mounting end and a second free end of the pawl, and a second one of said narrow grooves on each braking pawl located near said first mounting end of the pawl, said narrow grooves allowing resilient deformation of said pawls at pre-selected locations so that rotation of said tape reels is inhibited in said locking condition even when rotational torques and/or lateral forces are exerted on the tape reels;

means for biasing said brake body toward said locking position;

structural formations positioned adjacent the ends of the guide walls adjacent to the tape reels and adjacent to the outer surfaces of the pawls facing away from one another for limiting outward deformation of the braking pawls away from one another; and a stopper member positioned on said cassette between said braking pawls for limiting deformation of the braking pawls toward one another.

* * * * *